Dec. 20, 1960

O. A. HANSEN ET AL 2,964,918

METHOD AND APPARATUS FOR DISPENSING GAS MATERIAL

Filed March 11, 1957

INVENTORS
ODD A. HANSEN
WILFRIED HAUMANN

BY Thomas J. O'Brien
ATTORNEY

Dec. 20, 1960     O. A. HANSEN ET AL     2,964,918
METHOD AND APPARATUS FOR DISPENSING GAS MATERIAL

INVENTORS
ODD A. HANSEN
WILFRIED HAUMANN
ATTORNEY

Dec. 20, 1960     O. A. HANSEN ET AL     2,964,918
METHOD AND APPARATUS FOR DISPENSING GAS MATERIAL
Filed March 11, 1957     3 Sheets-Sheet 3

INVENTORS
ODD A. HANSEN
WILFRIED HAUMANN
BY Thomas J. O'Brien
ATTORNEY

United States Patent Office 2,964,918
Patented Dec. 20, 1960

2,964,918
METHOD AND APPARATUS FOR DISPENSING GAS MATERIAL

Odd A. Hansen and Wilfried Haumann, Kenmore, N.Y., assignors to Union Carbide Corporation, a corporation of New York Filed Mar. 11, 1957, Ser. No. 645,191

20 Claims. (Cl. 62—52)

This invention relates to a method of and apparatus for distributing and dispensing a gas material having a low boiling point at atmospheric pressure, and particularly to the distribution of such material in liquefied form to customer apparatus from which the material is dispensed as a gas.

Low-boiling gases, those having boiling points below 230° K. at atmospheric pressure, such as oxygen, for example, present many difficulties and problems not encountered in the handling of ordinary gases. Service in the form of compressed gas delivered in single or clustered high pressure containers is at best suitable only for customers whose consumption is low and/or sporadic. Such service is understandably expensive because of the high costs of handling the necessarily heavy containers whose weight is very high in comparison to the weight of the contained product. Customers having such or moderately higher demands have also been serviced by means of high pressure tubular receivers installed at their plants, the receivers being periodically serviced by means of a pump-equipped liquid truck which transports the material to the customer in liquid form and charges such receivers with high pressure gas. These trucks must be specially equipped for this service and represent a large capital expense. Furthermore, the delivery of gas is time consuming owing to the limited capacity of portable high pressure pumps.

Another known type of distribution system for dispensing low-boiling gas involves a cold converter that receives liquid pumped from an insulated tank transport truck. Such a system has been found economical when servicing customers with large demands, for example, when deliveries constitute full transport truck or tank car quantities, but leave much to be desired in investment and operating costs for smaller capacity systems. Known systems of this type usually involve product loss, and their mechanical components require frequent inspection and maintenance to avoid breakdown. Furthermore, utilities such as steam and electricity are usually required for the transfer and vaporization of the liquid.

The principal object of the present invention is to provide more economical low-boiling liquefied gas service to customers having moderate gas demand. More particularly, it is an object of this invention to provide an improved type of system for distributing and dispensing low-boiling gases which system is characterized by low capital investment, simplicity in operation, and loss-free operation.

One new object and result is to service a customer converter installation without having to employ a special liquid $O_2$ transport tank truck and whereby the delivery of a charge of $O_2$ can be made by ordinary common carrier such as a platform truck or gas cylinder truck and by a truck driver or porter without requiring a trained operator.

Another object of this invention is to provide a new method of and apparatus for transferring liquefied gas from a transfer storage vessel to a gas dispensing storage vessel, which is self-sufficient in that it does not require outside utilities for power, heat, or control purposes.

Another object of this invention is to provide a distribution system for low-boiling liquefied material which provides an improved and automatic liquid transfer cycle for making delivery of such material to consumer converter units.

These and other objects, features and advantages will become apparent from the following detailed description of the accompanying drawings in which.

Figure 1:
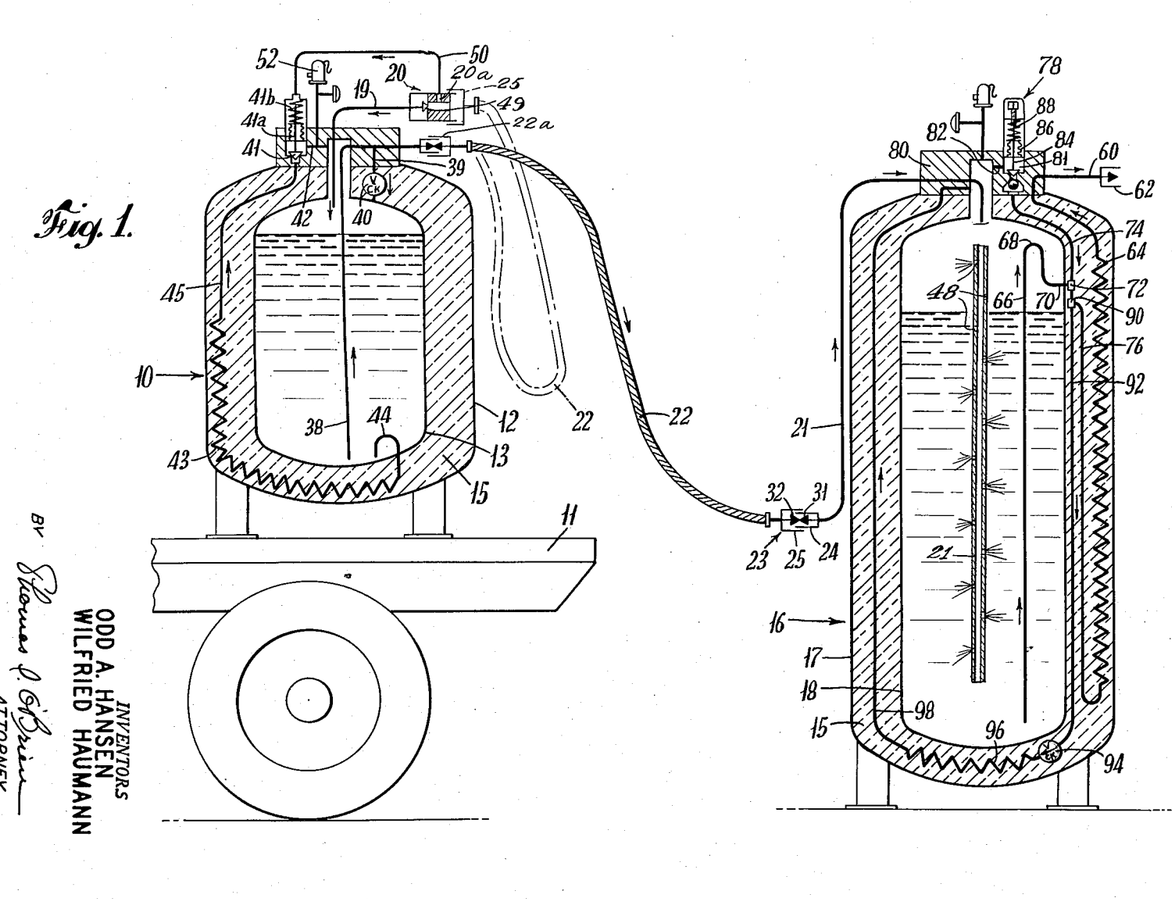
Fig. 1 is a diagrammatic illustration partly in elevation and partly in vertical cross section, showing a system for transferring liquid oxygen from a portable container to a receiving container in accordance with the present invention.

Referring now to Fig. 1 of the drawings, there is shown a system for supplying and dispensing liquefied low-boiling gas material, such as liquid oxygen or nitrogen, illustrating the principles of this invention. A portable liquid transport container 10 is shown supported on a truck chassis 11. The container 10 comprises an outer casing 12 and an inner vessel 13 spaced inwardly from the casing so as to provide a suitable space for thermal insulation 15. The thermal insulation may be of any form which has a low coefficient of heat transfer, such as for example, a low conductive opacified powder-in-vacuum insulation which is disclosed in copending application, Serial No. 580,897, filed by L. C. Matsch and A. W. Francis on April 26, 1956.

The consumer installation includes a liquid receiving tank or container 16 that has an outer casing 17 and an inner vessel 18 spaced inwardly to provide an intervening space for insulation 15 which may be the same as the insulation used in the transport container 10.

The stationary receiving container 16 has a capacity which is substantially greater than, preferably two and one half times as great as, the portable transport container 10. The latter is filled at a central liquid supply station (not shown) and is transported to the site of the customer installation, usually by truck as shown. At the filling station, low-boiling gas material is charged into the portable container 10 by means of conduit 19 leading from a filling connection 20 to the top portion of the container. Thus, liquid enters the container through the gas phase of the container and conduit 19 will hereinafter be referred to as a "vapor phase connection." The container is charged with liquid saturated at a low pressure, preferably near atmospheric pressure, and as will be seen more clearly hereinbelow, such charging through the gas phase effects recondensation of residual gas in the container so that there is no need for blow down before filling and so that the container becomes filled with liquid approximately in equilibrium with the vapor therein.

When a portable container is brought to the customer installation and a delivery is to be made into the stationary tank 16, the attendant merely makes a single connection to the filling connection 21 on the customer installation. To this end a flexible hose line 22 connected to the discharge connection 22a of the transport container 10 is joined to the filling connection 21 of tank 16, by a single quick-connecting hose coupling 23. The latter is shown schematically in Fig. 1; a preferred coupling is shown in detail in Fig. 4 and comprises a male member 24 fixed on the customer's tank line 21 and a female member 25 attached to the transfer hose 22. The order of attachment may of course be the reverse.

When the coupling is to be connected, the nipple 26 is inserted into a socket 27. After several threads are engaged, the outer surface of the nipple slidably engages an O-ring 28 to prevent leakage during the coupling operation. Further engagement of the nut 29 with the threaded surface 30 of the male member presses together the ends of valve plugs 31 and 32 in the male and female members, respectively. This forces the plugs away from their seated positions and thereby causes opening of the flow passage through the coupling so as to permit flow therethrough in either direction. Final tightening of the nut 29 effects a metal-to-metal seal between the tapered surface 33 at the inner end of socket 27 and the forward end of the nipple 26, as shown by broken lines in Fig. 4. The plugs 31 and 32 are normally urged toward their seated position by compression springs 34, 34 which are disposed between the back side of the plugs and spider assemblies 35, 35. These spiders limit the movement of the plugs and also carry studs 36, 36 which guide the plugs in their movement. A handle 37 is provided on nut 29 so as to eliminate the need for separate tools.

Figure 4:
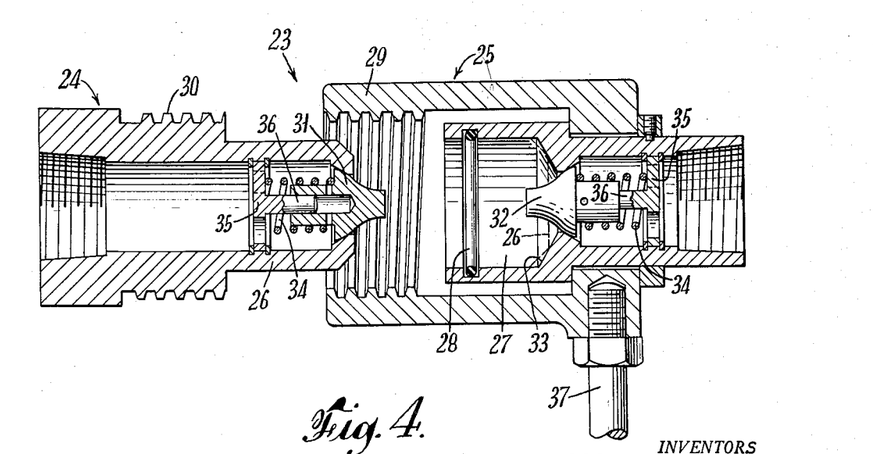
Fig. 4 is a longitudinal cross section through a preferred form of coupling for uniting components of the single connection between the supply container and the receiving container of the present invention.

After the coupling is connected and pressurized, the primary seal depends on the metal-to-metal seal. The O-ring is required primarily to prevent leakage during that part of the coupling (or uncoupling) operation when neither the metal seal 33, 26 nor the plugs 31, 32 are seated.

When being disconnected, the sequence is the reverse of the coupling operation. Upon loosening the threads, the metal-to-metal seal is broken, but leakage is prevented by the O-ring. Further loosening permits the plugs 31, 32 to again seat against their respective ports, and this isolates the separable parts of the coupling from pressure in both vessels. Still further loosening disengages the O-ring from surface 26, and the pressure remaining entrapped between the O-ring and seated plugs will be relieved harmlessly through the remaining threads. Final separation of the last several threads will be accomplished with internal pressure substantially equalized with the atmosphere and without hazard to the operator.

When the coupling 23 is connected, initially there is a pressure equalization between the normally low pressure of the transport container 10 (usually about 12 p.s.i.g.) and the higher pressure of the receiving container or converter 16 (for example, 120 p.s.i.g.). For this purpose, the filling connection line 21 of the converter has connection with the gas as well as the liquid phases of the converter 16, and the liquid delivery line 38 leading from the lower portion of the transport container inner vessel 13 to the discharge connection 22a has a branch line 39 connected with the gas phase of that vessel. A check valve 40 operates in a direction to permit pressure equalization through the liquid transfer line when converter pressure exceeds the pressure of the vessel 13. In the preferred embodiment of Fig. 1, when the pressure in the transport container reaches a predetermined pressure, for example, 70 p.s.i.g., a pressure building valve 41, which is operated in response to inner vessel pressure through a line 42, opens and activates the pressure building circuit which includes a pressure building coil 43 connected at one end with the lower part of the liquid phase of vessel 13 through trap 44 and at its other end with a line 45 connected with the gas phase of the vessel through valve 41 and line 42. When valve 41 opens liquid flows into coil 43 under the head in vessel 13 and is vaporized and the resulting vapor is returned to the gas phase of the vessel to build pressure therein. Pressure building continues as long as valve 41 is open. When the pressure in the transport container exceeds the pressure in the converter 16, check valve 40 closes and liquid transfer begins and continues until the entire content of the container 10 is transferred. When the container 10 is emptied, its residual pressure is in excess of converter pressure and such excess also blows through the transfer lines until the pressures in the two containers are again equalized. The coupling 23 is then disconnected and the transfer is complete.

In the event that the pressure in the converter 16 is not sufficient to provide by means of vapor pressure equalization, a pressure sufficient to operate the valve 41, such as when the system is first placed into operation, the valve 41 may be opened by building gas phase pressure in the following manner. A small amount of gaseous material is vented through the hose 22 from container 10 to the atmosphere before coupling such container to the converter. This draws a quantity of liquefied material into the hose 22. When venting is discontinued, the liquid will evaporate to build pressure in the gas phase through check valve 40. When the pressure setting of the valve 41 is reached, it will open to initiate pressure building and the coupling 23 can be connected to begin the liquid transfer.

Figure 2:
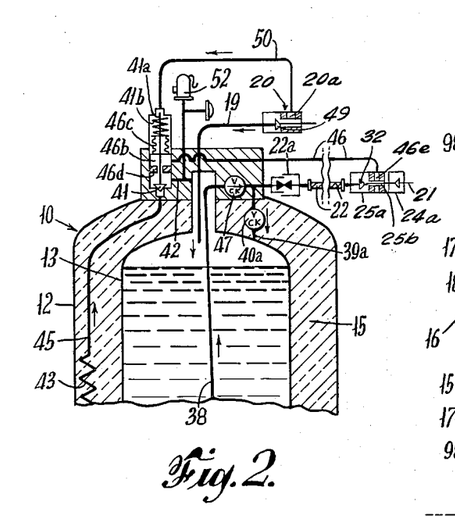
Fig. 2 is a fragmentary diagrammatic illustration of a portable supply container illustrating a modification of the system of Fig. 1.

The pressure equalizing step is not essential to the operation of the system and pressure building in the transport container 10 can be effected entirely by the pressure building system. In such a case the valve 41 can be made responsive to an external source of pressure, such as the pressure in the converter 16. A preferred embodiment of this type of valve activation is shown in Fig. 2, wherein the pressure in the converter is utilized at the beginning of a transfer operation to energize the pressure building means in the supply container. Here, pressure is fed from the converter 16 to the valve 41 through filling line 21 and a line 46 connected with the coupling component 25a attached to the transfer line 22. A check valve 47 is provided in the liquid withdrawal line 38 to permit flow through such line in the direction from the liquid phase to the discharge connection only, so that there will be no pressure equalization through the liquid phase. Line 46 extends from a port 46e in the coupling component 25a to a chamber 46b, which is closed at one end by a flexible bellows 46c and at its other end by a fixed partition 46d. The free end of the bellows is attached to a valve plunger 41a so that when pressure is admitted into chamber 46b, the plunger is urged in a direction to unseat valve 41. When pressure in chamber 46b is released, a yieldable spring member 41b acts on the free end of the bellows to urge the valve 41 to closed position. As shown schematically in Fig. 2 the port 46e in the coupling component 25a opens into a chamber extending between the seats for the valve plugs 31 and 32. It is thus opened to the atmosphere when the component is uncoupled from the mating coupling component 24a on the filling line 21, and to the transfer passageway 25b when the components are coupled, as during a transfer operation. Accordingly, when the liquid transfer line 22 is coupled to the filling connection 21 of the converter 16 pressure will be fed back from the converter to chamber 46b through the filling connection 21, port 46c and line 46, thereby urging the valve 41 to open position to initiate operation of the pressure building circuit.

The embodiment shown in Fig. 2 may also be used with pressure equalizing at the beginning of a transfer operation. In such a case, a branch connection 39a having a check valve 40a therein is provided between the liquid withdrawal line 38 and the top portion of the vessel 13, the valve being operative to permit flow only in the direction from the withdrawal line 38 to the chamber within vessel 13.

The principle of operation of the pressure building coil 43 in the transport container 10 is unique. Unlike pressure building systems of the prior art, the preferred pressure building system of the present invention does not employ a pressure control valve on the vaporizing coil to control, as by throttling, the rate of pressure building, and it provides a store of heat sufficient to effect pressure building so that atmospheric heat absorbed by convection during a transfer operation assists pressure building to only a minor or inconsequential degree.

The usual approach to the design of an atmospheric pressure building coil is to rely solely upon the heat abstracted from the surrounding air. Since electric driven air circulating fans are excluded by the absence of utilities, this means that considerable atmospheric heat must be transferred to the coil by natural convection during the short time interval allowable for economic operation. Heat transfer coefficients of natural convection are very poor, and this fact together with the necessary allowance for the insulating effect of ice and snow formations on the coil indicate the requirement for a very long, large-surface-area coil with as much tube area as possible exposed to the atmosphere.

Moreover, the usual design of pressure building coils assumes a mode of operation in which the circuit is throttled in order (a) to limit the degree of pressure building, and (b) to maintain a reasonably steady pressure throughout operation. This approach imposes three requirements on a system:

(1) Provision of a manual or a pressure responsive control valve, (2) Provision of extra coils or extended surface to allow for icing, and (3) Location of a substantial portion of the pressure builder below the lowest liquid level in the container so that adequate static head is available to maintain a rather high rate of vaporization even at low liquid levels.

Figure 5:
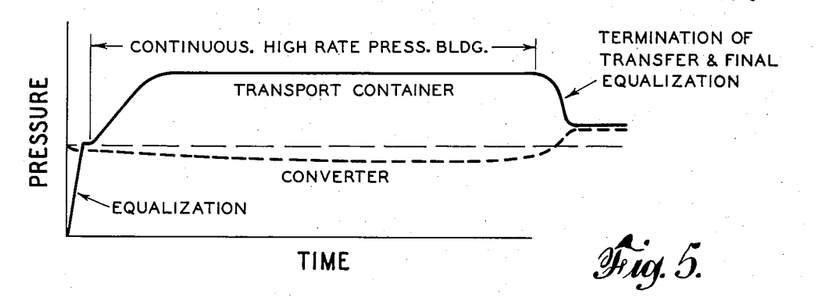
Fig. 5 shows graphically the time-pressure relationship during a liquid transfer operation which occurs in a system of the present invention when utilizing known types of pressure building vaporizers.

Fig. 5 is a graph of pressure vs. time for a liquid transfer operation occurring in a system of the present invention when using known types of pressure building vaporizers and throttled control. From this curve another disadvantage of the conventional mode of pressure building appears. The high pressure existent in the transport vessel when the transfer is complete results in a relatively high pressure in both containers after final equalization. This causes considerable variation in converter pressure, and the chances are greater of developing excessive pressure in the transport vessel 10 with resultant loss on the return trip to the filling station.

Figures 6, 7, 8:
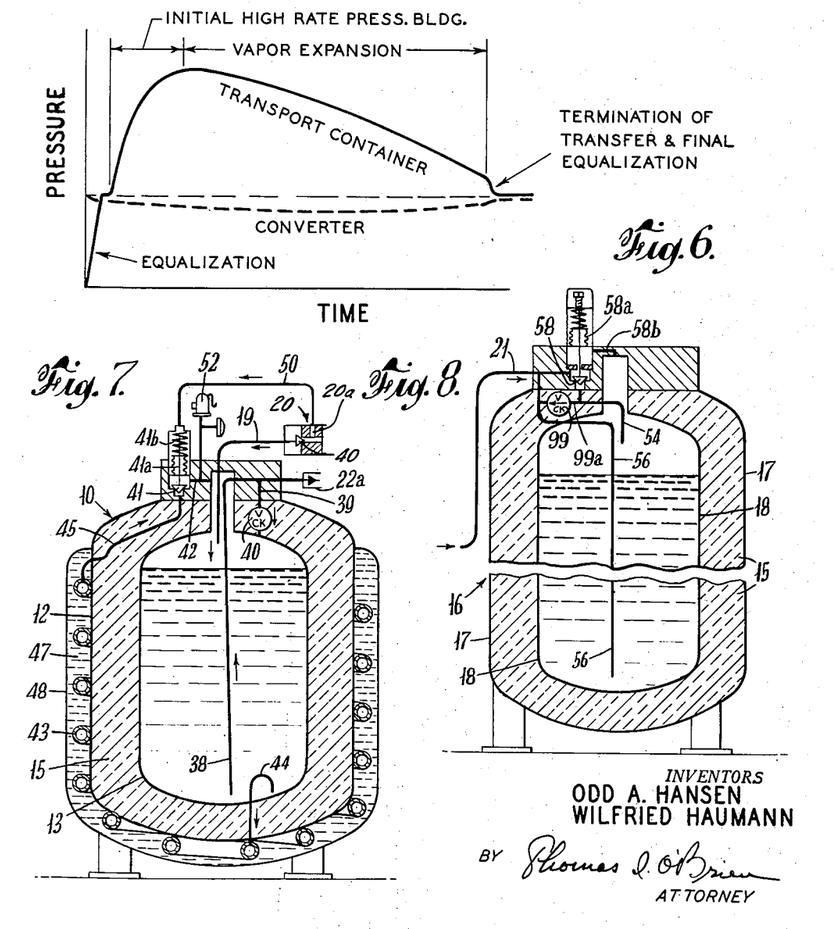
Fig. 6 is a diagram showing graphically the time-pressure relationship during a liquid transfer operation which occurs in a system of the present invention utilizing a special improved vaporizing cycle for pressure building.
Fig. 7 is a vertical diagrammatic illustration of an alternative type of portable container suitable for use in the present invention.
Fig. 8 is a vertical diagrammatic illustration of a further modification of the receiving container of the present invention.

In the preferred method of constructing and operating the system of the present invention, advantage is gained by recognition of the fact that conditions are most favorable for pressure building at the start of the transfer cycle when the transport container 10 is full. The majority of the vaporization for pressure building is done under these conditions, making it unnecessary to maintain a high rate of vaporization toward the end of the cycle. Thus, a relatively small part of the heat transfer surface need be located below the liquid container. Advantage is also taken of the heat stored in materials which are in thermal contact with the coil, directly or indirectly, such as the vacuum casing, and the outermost layer of insulation. The tube coils of the pressure building vaporizer are disposed over such area of the vacuum casing that the stored heat thus available to the coils is substantially sufficient for the entire pressure building step of the transport container. This means that heat transfer to the boiling film within the coil takes place primarily by solid conduction from surrounding materials rather than by natural convection from the atmosphere. The coil may therefore be located inside the casing where it is not susceptible to mechanical damage. Its required length is also less, resulting in lower weight and bulk in the container. Finally, since the stored heat in the materials disposed in heat exchange relation with the coil is limited in quantity to approximately the pressure building needs of the transfer operation, it is not necessary to provide manual or automatic means to control the rate of pressure building. The full capacity of the coil is utilized throughout, and this results in a rapid surge in pressure on the container at the beginning of the cycle. The vapor above the liquid is thus compressed well above the converter pressure, and as the heat ballast of the transport container is gradually exhausted, this vapor expands to drive the remaining liquid from the vessel. The net result is a much smaller and simpler pressure building system. Figure 6 is a graph of pressure vs. time for an actual transport container transfer which utilized this preferred method of pressure building and proceeded to completion. It will be noted that the transport container pressure is reduced to a relatively low value at the end of the transfer and the pressure after final equalization is therefore at the minimum permitted by converter operating pressure.

An alternative construction utilizing the pressure building principle of the present invention is shown in Figure 7. In this case, additional ballast is provided in the form of a fluid 47 such as brine, which is contained in a jacket 48 surrounding both the vacuum casing 12 and the pressure building coil 43. During the pressure building step, the fluid freezes and releases latent heat of fusion as well as sensible heat. In this way, the heat ballast of the system may be greatly increased with minimum additional weight and bulk. The fluid ballast has not been found necessary for satisfactory operation of relatively small portable containers.

Upon arrival of a transport vessel according to this invention at the receiving container, the heat content of the liquid in the transport container should correspond to a saturated liquid pressure well below the setting of safety devices on the transport container. This is so that adequate margin will exist for superimposing the non-equilibrium pressure needed for driving the transfer at a high rate. Furthermore, the heat content of the liquid in the transport container should not be greater than that of liquid saturated at normal receiver operating pressure. Otherwise, the liquid entering the receiver will flash, increasing the receiver pressure and decreasing the pressure difference available for driving the transfer. In general, it will be found advantageous to maintain a low heat content in the liquid to be transferred so that the design pressure of the transport container need not be unreasonably high, and so that the pressure in the receiving container will be as steady as possible. A low heat content of receiver liquid will also provide high heat leak absorbing capacity and will help avoid loss of gaseous material through safety vents after extended periods of idle storage.

Whereas it is a relatively simple matter to build pressure on the transport container and initiate transfer into the receiver, there are several critical requirements to be met in order to effect a complete pressure transfer of the entire body of low temperature liquid. One essential condition to be maintained for a complete transfer is that the liquid in the transport container 10 must be kept subcooled by non-equilibrium pressure building at all times during the transfer. The maintenance of non-equilibrium conditions is assisted by the vertical cylindrical shape of the transport container which avoids disturbing the warm surface strata of saturated liquid as the liquid level drops. This surface strata serves to insulate the colder liquid from the warmer vapor, and to prevent condensation of pressure building vapor into the liquid. A vertical cylindrical shape helps avoid disturbing the saturated surface strata since there is no change in surface area of the liquid body during withdrawal. In a horizontal cylindrical or a spherical vessel, considerable circulation of the liquid would occur due to a wide change in surface area as the level drops. A substantially greater quantity of pressure building vapor would thus condense into the liquid with consequent increase in heat content of the liquid.

Another essential requirement for complete transfer is to minimize heat pick-up of the liquid being transferred. To this end, a high rate of pressure building and of liquid transfer is very important since minimum time is thus allowed for vapor condensation during pressure building and for heat leak while en route. If for any reason, the rate of flow should drop substantially during the transfer operation, then the heat content of liquid en route will increase due to heat leak. At some reduced rate of flow, the liquid will acquire sufficient heat to flash upon entering the receiver thereby increasing its pressure and further slowing the rate of flow. If this condition continues, complete equalization will soon occur even though substantial quantities of liquid may remain in the transport container.

A third essential for a complete transfer is that the pressure in the receiving container should not be permitted to build up appreciably during the transfer. Even though the entering liquid is subcooled, the receiver pressure will tend to increase due to the reduction in volume of the vapor space as more and more liquid is introduced. In order to maintain the maximum pressure difference for driving the transfer and also to allow the converter to be operated in normal manner throughout the filling operation, the transferred liquid is delivered into the converter 16 partly through the vapor phase (to condense vapor and reduce the pressure) and partly through the liquid phase (to compress the vapor and increase the pressure). The flow is proportioned so that the filling operation does not cause the converter pressure to rise, and preferably causes the pressure to drop slightly. In the preferred embodiment of Fig. 1, the filling line 21 is provided along its length inside the container with small holes or slits 48 which are properly sized and positioned to obtain the above-mentioned proportioning. The slits also provide communication between the gas phase of the converter 10 and the filling line 21 which is necessary as described above for automatic pressure equalization at the beginning of the transfer operation.

By employing the axially spaced slits 48, the converter pressure-time characteristic of Figure 6 was obtained. The slight reduction in converter pressure is beneficial as it increases the driving force for the transfer, and also contributes toward restoration of normal operating pressure following final equalization.

A special feature of the axially-spaced apertures on the filling line 21 is that they provide automatic control without moving elements of the proportioning of the incoming liquid through the vapor and liquid phases. When liquid of very low heat content is transferred, the vapor pressure of the receiver would be excessively reduced if the relatively high mass rate of flow of liquid entering through the vapor phase at the beginning of the transfer remained constant during the entire transfer operation. By the present invention, as the liquid level in the container 16 rises, successively higher apertures 48 are submerged and the discharge through the vapor phase is gradually diminished. In this way, a predetermined final pressure can be obtained in the container, which pressure will normally be the desired service pressure. As shown in Fig. 8, however, the perforated entry line 21 can be replaced by separate gas and liquid phase lines 54 and 56, respectively. There, the proportioning control may be achieved by a proportioning valve 58 which may be operated manually or automatically in response to a suitable condition. Valve 58, as shown, is operated automatically in response to receiver pressure. Liquid will usually enter the receiver preferentially through the vapor phase connection 54, and control valve 58 is therefore located in this line. The bellows motor 58a, which operates the valve, is open to the interior of the receiver 18 by a line 58b, and is operative when pressure in the receiver increases to urge the valve away from its seated position so as to allow more liquid to enter gas phase for pressure reduction, and when the pressure in the receiver decreases, to urge the valve toward its seated position so as to decrease the amount of liquid entering gas phase and thereby allow pressure build-up in the receiver. The function of check valve 99 in by-pass 99a connecting the vapor phase connection 54 with the liquid phase connection 56 is to permit pressure equalization between the receiver and transport container at the beginning of the transfer operation.

After a transfer has been completed, the transport container 10 is returned to the liquid distribution center where it is refilled from bulk storage. As described above, the transport container 10 is at the pressure of the converter 16 following a transfer operation. Since this pressure is normally above the setting of pressure building valve 41, any residual cold gas in the container 10 would ordinarily continue to circulate through the pressure building circuit, causing unnecessary warming of the container and probable loss of product on the return trip because of the high pressure resulting from such warming. In accordance with the present invention, this warming and attendant loss are avoided by providing a vent line 50 for the low-pressure side of the operator of the pressure building control valve 41 which leads to the filling connection 20 where it is normally open to the atmosphere through port 20a to vent such low-pressure side. The filling connection 20 which contains a normally closed valve 49, is similar in construction to the male component 24 of the transfer coupling 23, and is adapted to be coupled with component 25 on the end of the transport hose 22 immediately after a transfer operation, so that when the coupling is made, valve 49 is opened to connect line 50 with the vapor phase of the container 10 through line 19, port 20a being cut off with atmospheric communication by the component 25. The pressures on opposite sides of the operator of valve 41 are thus equalized, and the valve 41 will then close under the force of the valve spring 41b and will remain closed regardless of the pressure in the container.

With reference to the embodiment shown in Fig. 2, the pressure building circuit in the supply container is automatically inactivated when the liquid transfer line 22 is uncoupled from the filling line 21. Uncoupling of these lines exposes port 46e in the coupling component 25a to the atmosphere and thus serves to vent chamber 46b. The yieldable spring 41b then acts to close valve 41 and terminate pressure building in the supply container.

With reference now again to Fig. 1, when the container 10 is to be refilled, component 25 is disconnected from the filling connection 20 and is replaced by a similarly constructed coupling component of a plant filling line (not shown). In this way, the valve 49 is reopened and the pressure building circuit remains inactive since the pressures on opposite sides of the valve operator are still equalized through lines 19 and 50. The entering liquid is preferably at a temperature corresponding to a low saturation pressure; for example, 5 p.s.i.g., and is introduced under pressure as by pumping into the gas phase through line 19. The cold liquid quickly condenses the higher pressure vapor remaining from the preceding delivery, and this results in a pressure in the transport container 10 which is only about 15 p.s.i.g. after filling. Since the latter pressure is well below the setting of the safety device 52 of the container 10, ample margin is provided for pressure rise due to heat leak during subsequent transportation and/or storage. It is thus seen that the entire cycle of filling, delivery and refilling may be accomplished without loss of product. Of course, after filling of the container 10 is completed, the hose connection 25 can be recoupled to the filling connection 20 to maintain the valve 41 closed under the force of the valve spring regardless of the pressure in the cylinder.

The customer container or converter 16 provides a unique system for dispensing in gaseous form and at a predetermined service pressure material stored in liquid phase. Customer service is inaugurated simply by connecting service line 60 to the customer's line (not shown), said customer's line usually having a pressure regulating valve therein. The service line 60 is connected through a vaporizing coil 64 disposed between the casing 17 and the inner vessel 18 with both the liquid and gas phases of the vessel 18. The liquid phase connection, an eduction tube 66, passes from a point near the bottom of the vessel 18 upwardly to a loop 68 where it is reversely bent to extend downwardly to a line 70 which leads radially outwardly to a T-junction 72 interconnecting the liquid withdrawal line, the gas withdrawal line 74 and a line 76 leading to the inlet end of the vaporizing coil 64. The gas withdrawal line 74 is connected with the gas phase of the vessel through a back pressure controller, or gas flow regulator, 78 which is preferably disposed in the head 80 of the converter 16. Regulator 78 includes a chamber 81 which is open to the gas space of the vessel 18 through a passageway 82 and has a valve plunger 84 which is connected with a bellows 86 and which is normally urged toward a closed position by a compression spring 88 acting on one side of the bellows. The other side of the bellows is subject to pressure in the gas space which opposes the spring and will act to lift the plunger 84 when vessel pressure exceeds the setting of the regulator, thereby opening the gas space to the service connection 60 through the regulator 78, lines 74 and 76 and the coil 64. Thus, whenever pressure in the vessel 18 exceeds the setting of the regulator because of evaporation due to heat leak, the regulator opens and remains open until the pressure falls below such setting. If vessel pressure is above the setting at the initiation of a withdrawal period or becomes so during withdrawal period, withdrawal automatically takes place from the gas phase of the vessel until pressure in the vessel falls below the setting of regulator 78.

Line 76 leading to the coil 64 is branched about at the normal full liquid level at another T-junction or interconnection 90. A line 92 extends from this point vertically downward to a check valve 94 at one end of a vaporizing coil 96 forming part of a means for building and maintaining a pressure in the vessel 18 at a substantially constant valve during withdrawal for effecting delivery of the liquid phase material to the vaporizing coil 64 for delivery to the service connection 62 at the desired substantially constant pressure. The inlet portion of vaporizer coil 96 is located below the level of the liquid in the vessel 18, and preferably below the lowest point on the bottom of vessel 18 as shown in Fig. 1. A vapor return line 98 leads from the other end of coil 96 to the gas phase of vessel 18 for delivery of vaporized material into the gas space for building a non-equilibrium pressure therein.

Operation of the pressure building system is automatic, and gas will be generated for pressure building whenever liquid is available in line 92. The check valve 94 acts to prevent back-flow of vapor from the vessel gas space to the customer through the pressure building circuit and to prevent the vapor generated in the pressure building coil from flowing back to the customer rather than to the gas space of the vessel.

When a customer desires to make a withdrawal, the opening of the service connection to a demand establishes a pressure differential between line 60 and the interior of the vessel 18. If the pressure in the gas space exceeds the setting of regulator 78, withdrawal takes place from the gas phase as described above. If vessel pressure is below the setting of the regulator, the established pressure differential causes liquid to be forced up through the eduction line 66, over loop 68, down through lines 70 and 76, and into the vaporizer coil 64. At the same time, the flow of liquid into line 76 also results in the filling of vertical line 92 between interconnection 90 and check valve 94. The head thus established in line 92 provides a driving force for operating the pressure building system (i.e. liquid flows under the force of this head into the coil 94, is vaporized and returns as gas through line 98 to the gas space of the container).

Figure 3:
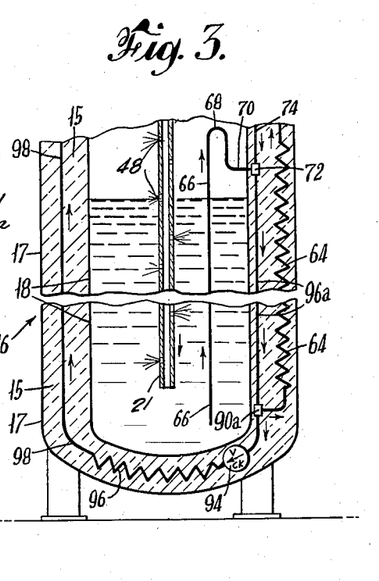
Fig. 3 is a fragmentary diagrammatic illustration of a receiving and dispensing container illustrating a modified type of gas withdrawal system.

As shown in Fig. 3, the head in the line 96a may be employed to feed liquid to the coil 96. In such a case, an interconnection 90a is provided at the lower end of the vertical line to pass liquid in such line to both the vaporizing coil 64 and to the pressure building vaporizing coil 96 through check valve 94. This however could require a larger line to accommodate both the vaporizer and pressure building coil liquid flows. The larger line would hold more liquid which must, at the termination of a liquid withdrawal period, drain through the pressure building coil 96, thereby resulting in a less desirable, larger pressure override in the vessel 18.

If container pressure reaches the setting of the regulator 78 during liquid withdrawal, valve 84 opens. When this valve opens, the pressure drop between interconnection 72 and the gas space is lower than the pressure drop across lines 66, 68 and 70, liquid flow is terminated, and further withdrawal takes place from the gas phase. Since liquid is no longer available at the interconnection 90 for delivery into line 92, the pressure building system automatically ceases to function until the pressure in the vessel falls below the setting of the regulator 78 to effect closing of valve 84. In order to insure against continued withdrawal of liquid when valve 84 opens, the junction point 72 must be at a level near or preferably above the normal full liquid level of the container so that any siphon action that might otherwise cause continued liquid flow will be destroyed. The loop 68 extends above the normal full liquid level of the container so as to provide and serve as a gas trap in the event the container is overfilled. Thus, if the container is overfilled, residual liquid in the coil 64 at the termination of a withdrawal vaporizes and expands, or residual gas in the coil 64 expands, and the gas under pressure forces liquid in the down side of the loop 68 back up over the top of the loop and forms a gas trap to prevent liquid feeding into the relatively warm vaporizing coils 64 and 96. Otherwise, if the top of the eduction tube was between the liquid level in an overfilled condition, liquid would feed into the warm coils and force warm gas back into the container, thereby adding undesired heat to the container. By such an arrangement, a relatively simple and automatic converter is obtained which has a minimum number of moving parts, providing reliability and greater dependability, and which allows the customer to withdraw gas at will without attention to, or control of, the converter.

It should be apparent however that various details of construction can be changed without departing from the spirit of this invention as defined in the appended claims.

What is claimed is:

1. A system for delivering low-boiling liquefied gas material stored at low pressure to a comparatively higher pressure receiver, comprising a supply container having a chamber therein for holding such material; a liquid transfer line extending from a lower region of the chamber to a discharge connection adapted to be connected with the receiver for delivering material thereinto; means for building a non-equilibrium pressure in said chamber continuously during a transfer operation, by vaporization of liquid stored therein, to force liquid in the chamber through said transfer line and into the receiver solely under a pressure difference established between said chamber and said receiver; pressure responsive means operative during a transfer operation to activate the pressure building means when subjected to a pressure exceeding a predetermined value substantially above normal storage pressures; means for subjecting said pressure responsive means continuously during a transfer operation to a pressure exceeding said predetermined value, including means for delivering gas under pressure, other than that resulting from normal evaporation in said chamber, to said pressure responsive means at the beginning of a transfer operation to initiate activation of said pressure building means.

2. A system for delivering low-boiling liquefied gas material as defined in claim 1 wherein said container is an upright, vertical, cylindrical container presenting a substantially constant liquid surface area as the liquid level therein recedes so as to enhance the maintenance of non-equilibrium conditions during the entire transfer.

3. A system for delivering a low-boiling liquefied gas material stored at low pressure to a comparatively higher pressure receiver, comprising a supply container having a chamber therein for holding such material; a liquid transfer line extending from a lower region of the chamber to a discharge connection adapted to be connected with the receiver for delivering material thereinto; means for building a non-equilibrium pressure in said chamber continuously during a transfer operation, by vaporization of stored liquid therein, to force liquid in said chamber through said transfer line for delivery into the receiver; pressure responsive means operative during a transfer operation to activate the pressure building means when subjected to a pressure exceeding a predetermined value substantially above normal storage pressures; means for subjecting said pressure responsive means continuously during a transfer operation to a pressure exceeding said predetermined value, including means for effecting a back-flow of gas from said discharge connection, by-passing the liquid stored in said chamber, to said fluid pressure operated means when the discharge connection is connected with the receiver at least until the pressure acting on such means exceeds said predetermined value so as to thereby effect initial activation of the pressure building means.

4. A system for delivering a low-boiling liquefied gas material stored at low pressure to a comparatively higher pressure receiver, comprising a supply container having a chamber therein for holding such material; a liquid transfer line extending from a lower region of the chamber to a discharge connection adapted to be connected with the receiver for delivering material thereto; means for building a non-equilibrium pressure in said chamber during a transfer operation, by vaporization of liquid stored therein, to force liquid in said chamber through said transfer line for delivery into the receiver; means responsive to chamber pressure and operative during a transfer operation to activate the pressure building means when subjected to a pressure exceeding a predetermined value substantially above normal storage pressures; and means for delivering gas under pressure, other than that resulting from normal evaporation in said chamber, to said pressure responsive means at the beginning of a transfer operation at least until pressure in said chamber exceeds said predetermined value and to initially activate said pressure building means.

5. A system for delivering a low-boiling liquefied gas material stored at low pressure to a comparatively higher pressure receiver, comprising a supply container having a chamber therein for holding such material; a liquid transfer line extending from a lower region of the chamber to a discharge connection adapted to be connected with the receiver for delivering material thereinto; means for building vapor pressure in said chamber including a vaporizer connected at one end with the lower portion of the chamber and at its other end with the top of the chamber; valve means controlling flow through said vaporizer and being movable between an open position activating the pressure building means and a closed position inactivating such means; pressure-operated valve positioning means controlling movement of said valve means and being responsive to a pressure differential created by a first pressure acting to urge the valve toward open position and a second pressure acting to urge the valve toward closed position; yieldable means acting on said positioning means in the same direction as said second pressure; means for selectively equalizing said pressures acting on said positioning means, so as to permit said yieldable means to close the valve means or imposing a pressure differential thereon, utilizing gas from a source other than that resulting from evaporation in said chamber due to heat leak, sufficient to overcome the force of said yieldable means so as to move said valve to open position.

6. A system for delivering a low-boiling liquefied gas material stored at low pressure to a comparatively higher pressure receiver, comprising a supply container having a chamber therein for holding such material; a liquid transfer line extending from a lower region of the chamber to a discharge connection adapted to be connected with the receiver for delivering material thereinto; means for building vapor pressure in said chamber including a vaporizer connected at one end with the lower portion of the chamber and at its other end with the top of the chamber; valve means controlling flow through said vaporizer and being movable between an open position activating the pressure building means and a closed position inactivating such means; yieldable means urging said valve toward closed position with a predetermined force; first fluid pressure responsive means operative when the pressure acting thereon exceeds a predetermined value to overcome the force of the yieldable means for urging the valve to open position; means responsive to atmospheric pressure and operable in counteraction to said first fluid pressure responsive means; and means for selectively delivering gas, other than that resulting from evaporation in said chamber due to heat leak, to said first fluid pressure responsive means to build the pressure thereon to a value exceeding said predetermined value, or exposing said first fluid pressure responsive means to the atmosphere to balance the counteracting pressures and permit said valve to be closed by said yieldable means.

7. A system for delivering a low-boiling liquefied gas material stored at low pressure to a comparatively higher pressure receiver, comprising a supply container having a chamber therein for holding such material; a liquid transfer line extending from a lower region of the chamber to a discharge connection adapted to be connected with the receiver for delivering material thereinto; means for building vapor pressure in said chamber including a vaporizer connected at one end with the lower portion of the chamber and at its other end with the top of the chamber; valve means controlling flow through said vaporizer and being movable between an open position activating the pressure building means and a closed position inactivating such means; yieldable means urging said valve toward closed position with a predetermined force; first fluid pressure responsive means operative when the pressure acting thereon exceeds a predetermined value to overcome the force of the yieldable means for urging the valve to open position; means for delivering gas, other than that resulting from evaporation in said chamber due to heat, to said first pressure responsive means to build the pressure thereon to a value exceeding said predetermined value; second fluid pressure responsive means operable in counteraction to said first fluid pressure responsive means; and means for exposing said second fluid pressure responsive means selectively to the atmosphere so that movement of the valve to open position is then opposed only by said yieldable means, or to a source of pressure at least balancing the opposing fluid pressure force on the valve, thereby permitting the yieldable means to urge the valve closed.

8. A system for storing low-boiling liquefied gas material stored at low pressure to a comparatively higher pressure receiver, comprising a supply container having a chamber therein for holding such material; a liquid transfer line extending from a lower region of the chamber to a discharge connection adapted to be connected with the recevier container for delivering material thereinto; means for building vapor pressure in such chamber including a vaporizer connected at one end with the lower portion of the chamber and at its other end with the top of the chamber; valve means controlling flow through said vaporizer and being movable between the open position activating the pressure building means and a closed position inactivating such means; yieldable means urging the said valve toward closed position with a predetermined force; said valve having means continuously responsive to pressure in said chamber for urging the valve to open position when the pressure therein exceeds a predetermined value substantially above storage pressures; second fluid pressure responsive means operable in counteraction to said first fluid pressure responsive means; and means for exposing said second fluid pressure responsive means selectively to the atmosphere when a discharge operation is to be commenced so that movement of the valve to open position is opposed only by said yieldable means, or to said chamber during storage periods so as to effect a balance of opposing fluid pressure forces on the valve and thereby maintain the valve closed under force of said yieldable means.

9. In a system for delivering a low-boiling liquefied gas material stored at low pressure to a comparatively higher pressure receiver, a supply container having a chamber therein for holding such material; a liquid transfer line extending from a lower region of the chamber to a discharge connection adapted to be connected with the receiver for delivering material thereinto; means for building a non-equilibrium vapor pressure in said chamber, by vaporization of liquid stored therein, to force liquid in said chamber through said transfer line for delivery into the receiver; said liquid transfer line having communication with said chamber above the normal full liquid level therein through a normally closed connection; and means operative to open said normally closed connection when pressure in said transfer line exceeds chamber pressure so that when the discharge connection is connected with the receiver, gas under the pressure of the higher pressure receiver can be blown back through the liquid transfer line to said chamber, by-passing the liquid phase of the contents of said chamber at least until the pressure in such chamber equals that in the receiver.

10. In a system for dispensing a low-boiling liquefied gas material, the combination with a consumer system comprising a receiver having a chamber for holding such liquid at a desired high pressure, of a supply container having a liquid holding chamber normally closed to the atmosphere; said supply container having a liquid transfer line in communication with a lower region of the supply container chamber through an open connection for liquid phase withdrawal and with said chamber above the normal full liquid level therein through a normally closed connection; said receiver having a filling line detachably connectable with said transfer line for delivering liquid into said receiver chamber, said filling line having communication with the lower region of the receiver chamber and also with the upper region thereof to permit flow of gas material in such chamber back into said filling line; and means operative to open said normally closed connection in said supply container when pressure in said transfer line exceeds supply container chamber pressure so that when said filling line is connected with said transfer line and pressure in said receiver exceeds pressure in said supply container, gas will flow from said receiver through said liquid transfer line and into the top region of said container chamber above the normal full liquid level therein until pressures in said supply container and receiver are substantially equalized.

11. In a system for dispensing a low-boiling liquefied gas material, the combination with a consumer system comprising a receiver having a chamber for holding such liquid at a desired high pressure, of a supply container having a liquid holding chamber normally closed to the atmosphere; said supply container having a liquid transfer line establishing communication between a discharge connection and a lower region of the supply container chamber through an open connection for liquid phase withdrawal; said receiver having a filling line detachably connectable with the transfer line at said discharge connection; means for building a non-equilibrium pressure in said supply container chamber during a transfer operation by vaporization of liquid stored therein, to force liquid in said member through said transfer line for delivery into the receiver; pressure responsive means operative during a transfer operation to activate the pressure building means when subjected to a pressure exceeding a predetermined value substantially above normal storage pressures of the supply container but below the normal pressures in the receiver chamber; and means for subjecting said pressure responsive means continuously during a transfer operation to a pressure exceeding said predetermined value, including means for passing sufficient gas under pressure from said receiver to said pressure responsive means at the beginning of a transfer operation to initiate activation of said pressure building means.

12. In a system for dispensing a low-boiling liquefied gas material, the combination with a consumer system comprising a receiver having a chamber for holding such liquid at a desired high pressure, of a supply container having a liquid holding chamber normally closed to the atmosphere; said supply container having a liquid transfer line establishing communication between a discharge connection and a lower region of the supply container chamber through an open connection for liquid phase withdrawal; said receiver having a filling line detachably connectable with the transfer line at said discharge connection; means for building a non-equilibrium pressure in said supply container chamber during a transfer operation by vaporization of liquid stored therein, to force liquid in said chamber through said transfer line for delivery into the receiver; means for equalizing vapor pressures in said receiver and container chamber at the beginning of a transfer operation; and means responsive to container chamber pressure and operative during a transfer operation to activate the pressure building means when subjected to a pressure substantially above normal storage pressures in said chamber but below the pressure in said chamber after pressure equalization, so that said pressure building means is activated and maintained active during the entire transfer operation.

13. In a system for dispensing a low-boiling liquefied gas material, the combination with a consumer system comprising a receiver having a chamber for holding such liquid at a desired high pressure, of a supply container having a liquid holding chamber normally closed to the atmosphere: said supply container having a liquid transfer line in communication with a lower region of the supply container chamber through an open connection for liquid phase withdrawal and with the chamber above the normal full liquid level therein through a normally closed connection; said receiver having a filling line detachably connectable with the transfer line for receiving and delivering liquid into said receiver chamber; said filling line having communication with the lower region of the receiver chamber and also with the upper region thereof to permit flow of gas material in said chamber back into said filling line; means for building a non-equilibrium pressure in said supply container chamber during a transfer operation, by vaporization of liquid stored therein, to force liquid in said chamber through said transfer line for delivery into the receiver; means operative to open said normally closed connection in said supply container when pressure in said transfer line exceeds supply container chamber pressure, so that when said filling line is connected with the transfer line and pressure in said receiver exceeds pressure in said supply container chamber, gas will flow from said receiver through said filling line and liquid transfer line into the gas phase of said container chamber until pressures in said receiver and supply container are substantially equalized; means responsive to supply container chamber pressure and operative during a transfer operation to activate the pressure building means when subjected to a pressure exceeding a predetermined value above normal container storage pressures but below equalization pressures, so that when said pressures are equalized said pressure building means is automatically activated and maintained active during the entire transfer operation.

14. In a system for dispensing a low-boiling liquefied gas material, the combination with a consumer system comprising a receiver having a chamber for holding such liquid at a desired high pressure, of a supply container having a liquid holding chamber normally closed to the atmosphere; said supply container having a liquid transfer line establishing communication between a discharge connection and a lower region of the supply container chamber through an open connection for liquid phase withdrawal; said receiver having a filling line detachably connectable with the transfer line at said discharge connection; said filling line having a communication with the lower region of the receiver chamber and also with the upper region thereof to permit flow of gas material in such chamber back into said filling line; said transfer line and said filling line respectively having normally closed valves therein movable to open position upon connection of the filling line with the transfer line at said discharge connection, so as to provide open communication therebetween; means for building a non-equilibrium pressure in the supply container chamber during a transfer operation, by vaporization of stored liquid therein, to force liquid in said chamber through said transfer line and said filling line for delivery into the receiver; pressure responsive means operative during a transfer operation to activate the pressure building means when subjected to a pressure exceeding a predetermined value substantially above normal storage pressures in said container chamber but below normal pressures in the receiver; and means for subjecting said pressure responsive means continuously during a transfer operation to a pressure exceeding said predetermined value, including means for passing gas flowing backward into said discharge connection, when the filling line is connected to the transfer line, to said pressure responsive means to initiate activation of said pressure building means.

15. In a system as defined in claim 14, wherein said filling line for delivering liquefied material into said receiver chamber includes a portion extending from a top portion of the chamber to a lower region thereof, said filling connection along its length in said chamber having lateral apertures for providing gas phase as well as liquid phase communication with said transfer line.

16. A method of dispensing low-boiling liquefied gas material from a transport container normally closed to the atmosphere to a receiver which is at a desired high pressure, which comprises providing a body of liquid in said transport container saturated at a pressure substantially below said desired high pressure; at the beginning of a transfer operation, transferring gas phase from said receiver to said transport container to equalize pressures in said receiver and said container; activating a pressure building circuit associated with said transport container in response to pressure in said container when the pressure therein reaches a predetermined value during such equalization and building pressure in said container by continuously withdrawing liquid from the liquid phase thereof, vaporizing the same and returning it to the gas phase thereof for building non-equilibrium pressure therein; when pressure in said transport container exceeds pressure in said receiver, transferring liquid from said transport container to said receiver under the pressure difference established by such pressure building while continuing said withdrawing for pressure building and while maintaining the receiver and container independent of each other as to pressure; and after liquid transfer has been completed, passing gas from said supply container to said receiver to equalize pressures in the receiver and the container.

17. A method of dispensing low-boiling liquefied gas material from a transport container normally closed to the atmosphere to a receiver which is at a desired high pressure, which comprises providing a body of liquid in said transport container saturated at a pressure substantially below said desired high pressure; withdrawing liquid from the container continuously for passage through a vaporizing element at the full capacity of such element, passing the same through such vaporizing element and returning it to the gas phase thereof for building non-equilibrium pressure therein; providing a store of atmospheric heat in conductive relation to the vaporizing element in a quantity sufficient so that when it is exhausted by the vaporization of liquid, sufficient pressure is generated in the container to effect a complete transfer; when pressure in said transport container exceeds pressure in said receiver, transferring liquid from said transport container to said receiver under the pressure difference established by such pressure building while continuing said withdrawing for pressure building and while maintaining the receiver and the container independent of each other as to pressure; and after liquid transfer has been completed, passing gas from said supply container to said receiver to equalize pressures in the receiver and the container.

18. A method of dispensing low-boiling liquefied gas material from a transport container normally closed to the atmosphere to a receiver which is at a desired high pressure, which comprises providing a body of liquid in said transport container saturated at a pressure substantially below said desired high pressure; establishing connections between the liquid phase of the transport container and the gas and liquid phases of said receiver; continuously withdrawing liquid from the liquid phase of the container, vaporizing the same and returning is to the gas phase thereof for building non-equilibrium pressure therein; when pressure in said transport container exceeds pressure in said receiver, transferring liquid from said transport container to said receiver under the pressure difference established by such pressure building while continuing said withdrawing for pressure building and while maintaining the receiver and the container independent of each other as to pressure; delivering transfer liquid into said receiver partly through the gas phase and partly through the liquid phase to maintain a pressure therein below that in said container; maintaining non-equilibrium pressure in said container during liquid transfer so as to provide complete transfer of all liquid in the transport container to said receiver; and after liquid transfer has been completed, passing gas from said supply container to said receiver to equalize pressures in the receiver and the container.

19. A container for storing and dispensing low-boiling liquefied gas material, said container having an insulated chamber for holding such material; a filling connection for delivering liquefied material into said chamber and extending between an upper region of the chamber and a lower region thereof, said filling connection comprising a tubular member defining an open passageway along its length and having along its length in said chamber axially spaced lateral apertures for discharging material into the chamber so as to provide a relatively high volume discharge of liquid into the vapor phase when the container is relatively empty of liquid and to progressively decrease the volume of liquid discharged into the vapor phase as the liquid level in the container rises and submerges successively higher apertures.

20. A method of transferring the entire contents of low-boiling liquefied gas material from a transport container normally closed to the atmosphere to a receiver which is at an initial higher pressure and which has a capacity substantially greater than the transport container, which comprises providing a body of liquefied gas material in said transport container saturated at a pressure substantially below said initial higher pressure; making a single connection between said receiver and said transport container through a transfer line communicating with a lower region of the transport container through an open connection for liquid phase withdrawal and with the transport container above the normal full liquid level therein through a normally closed connection permitting flow only in the direction from said transfer line to said transport container, said line communicating with the lower region of the receiver and also with the upper region thereof to permit flow of gas material in said receiver back through said line into said transport container; at the beginning of a transfer operation, transferring gas phase from said receiver to said transport container through said transfer line and said normally closed connection to equalize pressures in said receiver and said container; activating a pressure building circuit associated with said transport container and continuously building pressure in said container by withdrawing liquid from the liquid phase thereof, vaporizing the same and returning it to the gas phase thereof for building non-equilibrium pressure therein; when pressure in said transport container exceeds pressure in said receiver, transferring liquid from said transport container to said receiver through said transfer line under the pressure difference established by such pressure building while continuing said withdrawal for pressure building until the entire liquid contents of the transport container pass into the receiver and while maintaining the receiver and container independent of each other as to pressure.

References Cited in the file of this patent

UNITED STATES PATENTS

| | | |
|---|---|---|
| 1,753,785 | Heylandt | Apr. 8, 1930 |
| 2,037,673 | Zenner | Apr. 14, 1936 |
| 2,183,639 | Burdick et al. | Dec. 19, 1939 |
| 2,487,863 | Garretson | Nov. 15, 1949 |
| 2,544,734 | St. Clair | Mar. 13, 1951 |
| 2,580,710 | Wildhack | Jan. 1, 1952 |
| 2,813,401 | Smith | Nov. 19, 1957 |